United States Patent
Jowett

(10) Patent No.: US 11,809,601 B2
(45) Date of Patent: Nov. 7, 2023

(54) SYSTEM, METHOD, COMPUTER PROGRAM AND DATA SIGNAL FOR IDENTIFYING SOFTWARE CAPABLE OF CAPTURING PERSONALLY IDENTIFIABLE INFORMATION

(71) Applicant: Lens10 Pty Ltd, Cremorne (AU)

(72) Inventor: Robin Jowett, Cremorne (AU)

(73) Assignee: Source of True Pty Ltd, Waverly (AU)

( * ) Notice: Subject to any disclaimer, the term of this patent is extended or adjusted under 35 U.S.C. 154(b) by 147 days.

(21) Appl. No.: 16/635,581

(22) PCT Filed: Aug. 2, 2018

(86) PCT No.: PCT/AU2018/050808
§ 371 (c)(1),
(2) Date: Jan. 31, 2020

(87) PCT Pub. No.: WO2019/023756
PCT Pub. Date: Feb. 7, 2019

(65) Prior Publication Data
US 2020/0242272 A1   Jul. 30, 2020

(30) Foreign Application Priority Data

Aug. 2, 2017  (AU) ................................. 2017903065

(51) Int. Cl.
G06F 21/62   (2013.01)
G06F 16/955   (2019.01)
G06F 21/57   (2013.01)

(52) U.S. Cl.
CPC ........ *G06F 21/6263* (2013.01); *G06F 16/955* (2019.01); *G06F 21/577* (2013.01); *G06F 2221/032* (2013.01); *G06F 2221/2115* (2013.01)

(58) Field of Classification Search
CPC ... G06F 21/6263; G06F 21/577; G06F 21/554
See application file for complete search history.

(56) References Cited

U.S. PATENT DOCUMENTS 8,578,482 B1   11/2013   Yang et al.
2005/0188079 A1*   8/2005   Motsinger ........... H04L 63/1416
                                                                    709/224

(Continued)

OTHER PUBLICATIONS

Oleksii Starov et al "Extended Tracking Powers: Measuring the Privacy Diffusion Enabled by Browser Extensions", International World Wide Web Conferences Committee, Apr. 3, 2017, pp. 1481-1490, XP058327240 ISBN: 978-1-4503-4913-0, DOI: 10.1145/3038912.3052596, Republic and Canton of Geneva, Switzerland.

*Primary Examiner* — Dao Q Ho
(74) *Attorney, Agent, or Firm* — Edwin A. Sisson, Attorney at Law, LLC; Jeffrey J. Banyas

(57) ABSTRACT

Embodiments of the invention provide a system, method, software and/or a data signal for identifying software capable of capturing personally identifiable information. The method comprises the steps of connecting to a remote server via a local device, to send at least one request for data and retrieve at least one packet of data in response to the request. The method also determines whether the received requested data originated from a third party server other than the remote server, and if so, determines whether the data received contains evidence of the presence of personally identifiable information.

19 Claims, 2 Drawing Sheets

(56) References Cited

U.S. PATENT DOCUMENTS

| | | | |
|---|---|---|---|
| 2006/0020611 A1* | 1/2006 | Gilbert | G06F 21/6254 |
| 2008/0040225 A1* | 2/2008 | Roker | G06Q 30/02 |
| | | | 705/14.66 |
| 2008/0276315 A1* | 11/2008 | Shuster | H04L 51/12 |
| | | | 726/22 |
| 2011/0239288 A1 | 9/2011 | Cross et al. | |
| 2014/0280923 A1* | 9/2014 | Abraham | G06Q 10/0637 |
| | | | 709/224 |
| 2016/0142423 A1* | 5/2016 | Bird | H04L 63/145 |
| | | | 726/24 |
| 2017/0161520 A1 | 6/2017 | Lockhart, III et al. | |

* cited by examiner

SYSTEM, METHOD, COMPUTER PROGRAM AND DATA SIGNAL FOR IDENTIFYING SOFTWARE CAPABLE OF CAPTURING PERSONALLY IDENTIFIABLE INFORMATION

PRIORITIES AND CROSS REFERENCES

This Application claims priority from International Application No. PCT/AU2018/050808 filed on 2 Aug. 2018 and Australian Application No. 2017903065 filed on 2 Aug. 2017, the teachings of each of which are incorporated by reference herein in their entirety.

TECHNICAL FIELD OF INVENTION

The present invention relates to a system, method, computer program and data signal for identifying software capable of capturing personally identifiable information.

Embodiments of the invention find particular, but not exclusive, use in identifying executable code on websites which capture and store information that may be utilised to personally identify an individual and/or user of the website.

In a specific embodiment of the invention, the software determines whether personally identifiable information entered on a first website by a user is communicated to a third-party website or database without the user's informed consent.

BACKGROUND

There is a growing need to protect Personally Identifiable Information (PII). PII is any data that can be used to potentially identify a specific individual. Broadly, any information that assists in the identification of a specific individual (in other words, information that can be used to de-anonymise data that would otherwise be considered anonymous) is considered PII. Obvious examples of PII information include part or all of an individual's name, their driver's license number, their passport number, their personal phone number, etc.

However, other information which may not immediately be considered PII, but which can be used (in conjunction with other information) to identify an individual can also be sensitive and may also need to be protected. Such information may include GPS coordinates of a location of an individual, International Mobile Station Equipment Identity (IEMI) numbers which identify an individual's mobile telephone, information regarding religious, political or private organisation affiliations, and medical information, to name a few examples.

The inappropriate collection and/or storage of PII and information which is capable of being used to identify individuals has become a growing privacy issue, particularly as businesses and government departments move their services online and require individuals to divulge PII across networks and through intermediaries and third party providers, in order for the individual to interact with the business or government department.

Poorly written code, a lack of understanding regarding what information should be saved in databases or in cached memory (or in cookies and other permanent or semi-permanent stores of information associated with web based transactions), the use of intermediaries that are not transparent, and malicious code which is designed to deliberately capture sensitive PII, all contribute to exposing individuals to the inappropriate capture and potential inappropriate and illegal use of their PII.

Governments, in recent years, have implemented laws and regulations in an attempt to provide legal safeguards and standards to protect individuals. However, since websites, other online services, and apps commonly ignore, are ignorant of, are designed to circumvent, and/or operate across jurisdictional borders, laws and regulations can only provide a limited safeguard to individuals.

It is with these problems in mind that the present invention has been developed.

SUMMARY OF THE INVENTION

In a first aspect, there is provided a method for identifying software capable of capturing personally identifiable information, comprising the steps of, connecting to a remote server via a local device, to send at least one request for data and retrieve at least one packet of data in response to the request, determine whether the received requested data originated from a third party server other than the remote server, and if so, determine whether the data received contains evidence of the presence of personally identifiable information.

In one embodiment, the step of determining whether the received data contains personally identifiable information includes the step of determining whether the received data includes data that has a specific signature pattern.

In one embodiment, the method comprises the further step of determining whether the data has the specific signature pattern by comparing the data to a database of signature patterns.

In one embodiment, the method includes the further step of sending data with the specific signature pattern to an identification module arranged to classify the data into data that contains personally identifiable information or into data that does not contain personally identifiable information.

In one embodiment, the received data is sent to a user to allow the user to classify the data, wherein the classification elected by the user is utilised to provide input to the identification module.

In a second aspect, there is provided a system for identifying software capable of capturing personally identifiable information, comprising a module arranged to connect to a remote server via a local device, the module further being arranged to send at least one request for data and retrieve at least one packet of data in response to the request, and an identification module arranged to receive the at least one packet of data and determine whether the received data originated from a third party server other than the remote server, and if so, determine whether the data received contains evidence of the presence of personally identifiable information.

In a third aspect, there is provided a computer program, including at least one instruction and arranged to be executable on a computing system, wherein, upon execution, the computing system performs the method in accordance with the first aspect of the invention.

In a fourth aspect, there is provided a data signal, including at least one encoded instruction and arranged to be received and executed on a computing system, wherein, upon receipt and execution, the computing system performs the method in accordance with the first aspect of the invention.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DETAILED DESCRIPTION OF PREFERRED EMBODIMENTS

The present invention relates generally to a system, method, computer program and data signal for identifying software capable of capturing personally identifiable information. In particular, embodiments of the invention provide a website "plug in" which is capable of interacting with a web browser, although it will be understood that other embodiments may find use as standalone software applications, or apps, which may be arranged to operate on any suitable computing system including mobile computing and telecommunications devices.

In more detail, one aspect of the embodiments described herein provides a method for identifying software capable of capturing personally identifiable information. The method comprises the steps of, connecting to a remote server via a local device, to send at least one primary request for data and retrieve at least one packet of data in response to the at least one primary request and to determine whether any secondary requests generated from the at least one primary response are to be transmitted to a third-party server other than the remote server. If so, the method further determines whether the data sent to the third-party server contains evidence of the presence of personally identifiable information. Such a method may be implemented as a computer program, may be embedded in a hardware device (for example, a portable device arranged to physically connect to a computing system) or may be encoded in a data signal.

In other words, one broad aspect of the embodiments described herein provides a method for identifying software capable of capturing personally identifiable information where inappropriate capture of personally identifiable information may pose safety, security and financial risks to users of the system and/or other members of the public.

There is also provided a system for identifying software capable of capturing personally identifiable information, comprising a module arranged to connect to a remote server via a local device, the module further being arranged to send at least one request for data and retrieve at least one packet of data in response to the request, and an identification module arranged to receive the retrieved at least one packet of data and determine whether the received data originated from a third party server other than the remote server, and if so, determine whether the received data received contains evidence of the presence of personally identifiable information.

Figure 1:
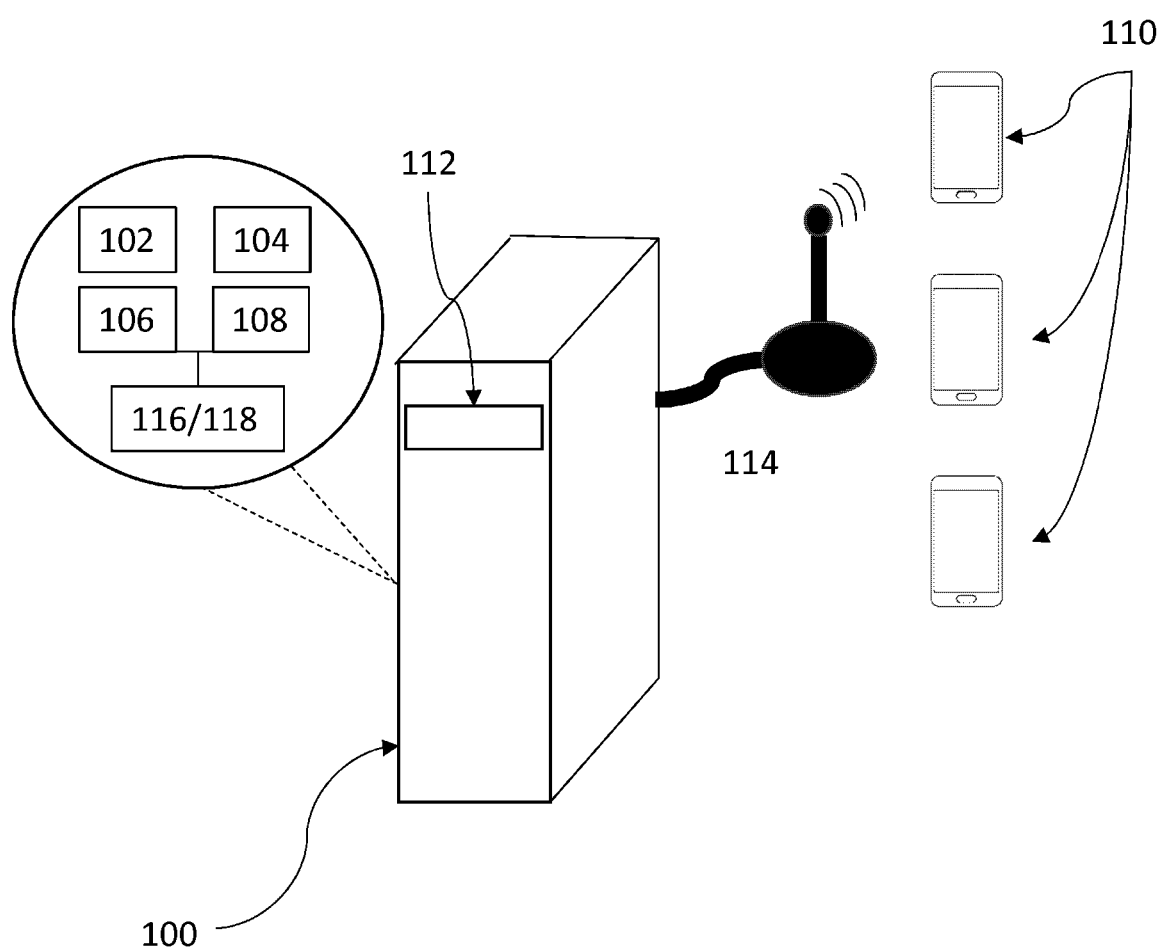
FIG. 1 is an example computing system which is capable of operating a device, system, method and/or computer program in accordance with an embodiment of the present invention.

One embodiment of the method is codified in a computing system, such as the computing system shown at FIG. 1.

In FIG. 1 there is shown a schematic diagram of a computing system, which in this embodiment is a server 100 suitable for use with an embodiment of the present invention. The server 100 may be used to execute application and/or system services such as ecommerce services, banking or insurance services, government services, or any other services where a user may be required to reveal personally identifiable information in order to interact with the server.

With reference to FIG. 1, the server 100 may comprise suitable components necessary to receive, store and execute appropriate computer instructions. The components may include a processor 102, read only memory (ROM) 104, random access memory (RAM) 106, an input/output devices such as disc drives 108, remote or connected input devices 110 (such as a mobile computing device, a smartphone or a 'desktop' personal computer), and one or more communications link(s) 114.

The server 100 includes instructions that may be installed in ROM 104, RAM 106 or disc drives 112 and may be executed by the processor 102. There may be provided a plurality of communication links 114 which may variously connect to one or more computing devices 110 such as servers, personal computers, terminals, wireless or handheld computing devices, or mobile communication devices such as a mobile (cell) telephone. At least one of a plurality of communications links 114 may be connected to an external computing network through a telecommunications network.

In one particular embodiment the device may include a database 116 which may reside on the storage device 112. It will be understood that the database may reside on any suitable storage device, which may encompass solid state drives, hard disc drives, optical drives or magnetic tape drives. The database 116 may reside on a single physical storage device or may be spread across multiple storage devices.

The server 100 includes a suitable operating system 118 which may also reside on a storage device or in the ROM of the server 100. The operating system is arranged to interact with the database and with one or more computer programs to cause the server to carry out the steps, functions and/or procedures required.

Broadly, embodiments of the invention relate to a computing method, system and computer program (or a data signal) arranged to interact with the server via the one or more remote devices that are connected to the server via the communications network. The remote devices include "browser" software (i.e. software capable of rendering HyperText Markup Language (HTML) and associated web browser technologies, including JavaScript language programs, Adobe Flash, Perl, and other data output and input methods), and an embodiment of the invention takes the form of a "plug in" application (which will hereinafter be referred to as the PII application) that interacts with the browser software. However, it will be understood that the PII application may also take the form of a standalone application, and that the PII application may also take the form of a server based application, as will be described in more detail later.

Figure 2:
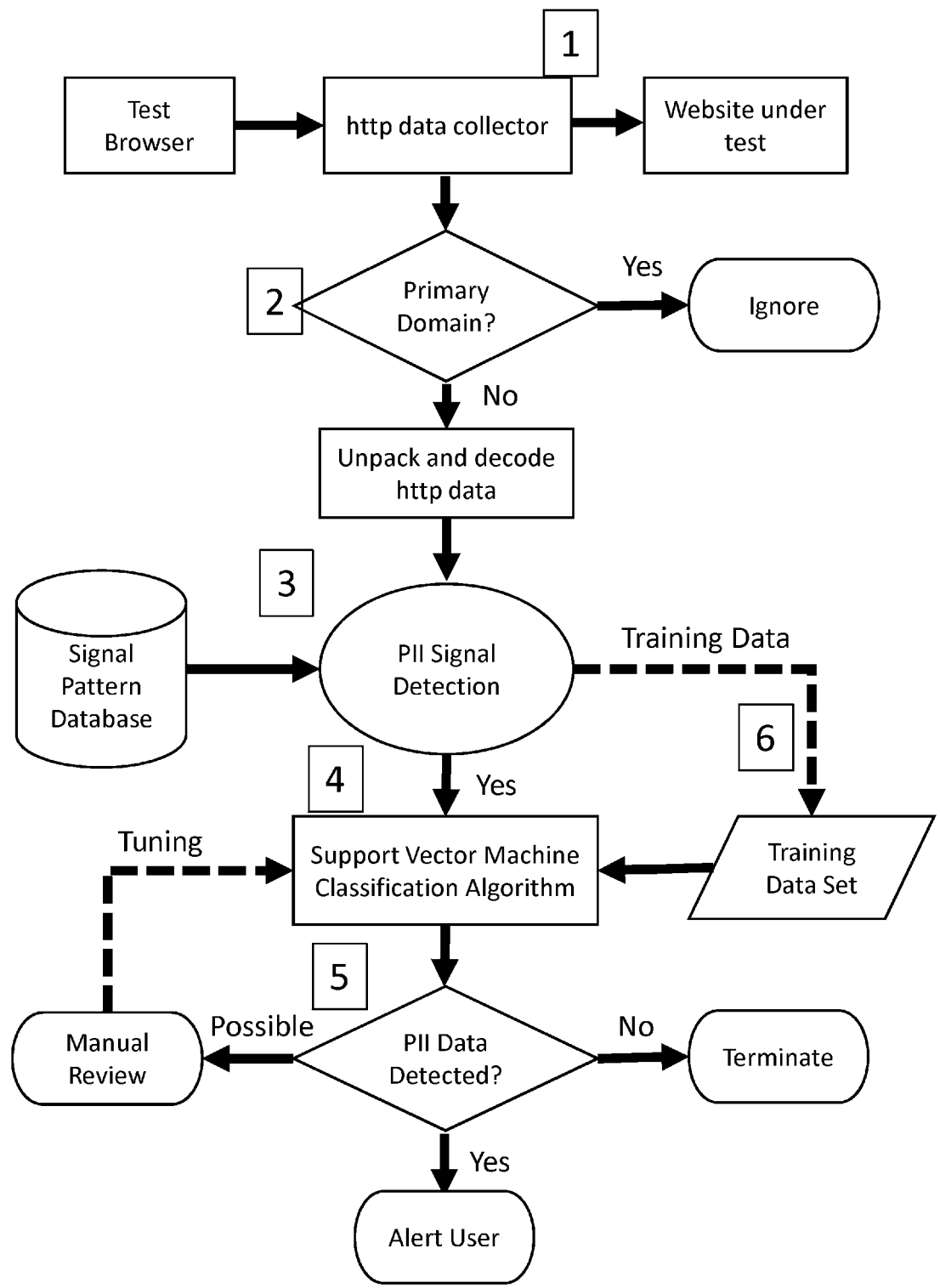
FIG. 2 is a flow chart illustrating a method in accordance with an embodiment of the invention.

Referring now to FIG. 2, there is shown a flow diagram 200 for a method of operation of a plug in PII application in accordance with an embodiment of the invention.

A test browser session is instantiated and the browser is directed, either manually or via an automated script instantiated and operated by the PII application, to access a web page or series of web pages on the web site which is to be tested.

All data transmitted from the test browser session to the web site and received by the test browser from the web site is arranged to pass through an http data collection server (1). The http data collection server is arranged to record all instances of data that are both sent from and received by the test browser session.

All data transmitted to third party domains (that is, non-primary domains that are different from the domain for the web site) is filtered out and passed to an unpacking and decoding module (2).

The unpacking and decoding module unpacks the http package and decodes the data residing in header fields, cookies, URL's and request bodies.

The decoded data set is then passed to a PII Signal Detection module (3). The module uses a signal pattern database to scan for "signals" that indicate the presence of PII data within the data set. A simplified signal pattern for detecting the presence of an email address in a data stream might be represented as the regular expression:

$$/\wedge A([\backslash w+\backslash-].?)+@[a\text{-}z\backslash d\backslash-]+(\backslash.[a\text{-}z]+)^*\backslash.[a\text{-}z]+\backslash z/i$$

The output is termed a PII "signal vector". A PII signal vector is a multi-dimensional Support Vector Machine (SVM)—Machine Learning System vector where each dimension reflects the presence or absence of specific PII data. A simple signal vector might have the following dimensions: gender, street address, city, country, postcode and age, to name a simple example.

In many real life cases, however, the signal vector may have many more dimensions, such as GPS co-ordinates, ID numbers, information regarding an individual's finances, their purchase history, etc., depending on the specific use case of the embodiment. For example, when filling in a loan application on a financial institution website, the vector may include dimensions that are intended to capture possible "leakage" of PII such as current assets and liabilities, current financial institutions used by the individual, even the amount of credit being sought. It will be understood that a person skilled in the art would understand the types of dimensions required for any particular use case, and such variations are within the purview of a person skilled in the art.

The signal vector is passed to the SVM, (4) which classifies the vector to determine whether it contains PII data. It will be understood that in the context of the present specification, the SVM is a software module that implements a supervised learning model with one or more associated learning algorithms that analyses data used for classification and regression analysis. A basic primer on the SVM can be found at, for example, https://en.wikipiedia.org/wiki/Sopport_vector_machine, which describes some of the underlying theory that underpins the operation of various types of known SVMs.

Given a set of training examples, each marked as belonging to one or the other of two categories, the SVM initially utilises a training algorithm that builds a model of PII and non-PII data. The algorithm then uses the model to compare the vector to the model and on the basis of the comparison, assigns the vector to either the PII data category or the non-PII data category, creating a non-probabilistic binary linear classification.

In other words, in mathematical (or statistical) terms, the SVM algorithm creates a model that is a representation of each vector as a "point in space", mapped so that the examples of the categories of PII and no-PII data are divided by a clear gap that is as wide as possible.

New vectors are then mapped into the existing space and predicted to belong to either the PII or non-PII category based on which side of the gap they fall. In this manner, as the PII application encounters more examples of PII and non-PII data, the model is refined with each example, thereby creating a learning process where, over time, the data set becomes larger and therefore, statistically, more accurate.

In some embodiments, particularly where there are a very large number of vectors, the SVM module may reside on a different computing system from the PII application. For example, the PII application may be a plug in for a web browser, but may communicate with a remote server that contains the SVM module or application. This may be required where a complex SVM algorithm is utilised that requires substantive computing power in order to correctly categorise each vector.

Of course, it will be understood that the SVM is only one example of a learning and classification algorithm that can be utilised to categorise PII and non-PII data. Other examples of appropriate algorithms may include (without limitation) decision tree algorithms, neural network algorithms, deep learning algorithms, inductive logic algorithms, decision trees (e.g. random forest), learning vector quantisation and rule based learning algorithms.

If no PII data is found the process terminates and the lack of PII data is communicated to the user.

However, if the algorithm, comprised of the PII signal detection module and the machine learning classification system, determines the presence of PII data (5) then the system may either report this finding directly to the user, or may, in certain embodiments, send the data to the user or to another party, so that the user or other party may perform a review. The review results in feedback being provided to the SVM, so that the SVM may "learn" from the input provided by the user and/or other party. It will be understood that in the context of the embodiment described herein, the terms "another party" and "other party" may refer to a person or may refer to another software application and/or computing system.

Training data (support vectors) (6) can also be extracted from the signal detection module for the purpose of training other instances of the PII application. That is, the training data can be uploaded to a central database (not shown in the Figures) which can then use the training data to provide updates to other instances of the PII software. An example of a simple training dataset is shown below in Table 1. The dataset is provided as a simplified example for a person skilled in the art, and it will be understood that in a real life embodiment, such a data set would be more complex. The present example is provided solely for the benefit of brevity and ease of understanding, and no gloss should be taken from the example and the table below to limit or otherwise vary the plain meaning of the invention claimed herein, as would be understood by a person skilled in the art.

TABLE 1

Simple Training Dataset

| Vector | Training Data | Pii Detected |
|---|---|---|
| 10000 | https://mydomain.com/unsubscribe?e=robin@email.com | True |
| 00010 | cd2=56%20young%20street | False |
| 00000 | c22=3146 | False |
| 00100 | c23=25y | False |
| 00011 | v1=1%20Dover%20Road,Australia | True |

It will be understood that the previously described embodiments have been described as a plug in to a web browser, but that the disclosure contemplates other equivalent forms of deployment, such as a standalone application, an app for a mobile device, a module which is incorporated into another type of software (such as anti-virus software), or any other suitable way the inventive concept and claimed invention may be deployed.

Advantages

One of the advantages of the embodiments and broader invention described herein is that the invention removes the onus on consumers (i.e. users of computing networks, commercial and government websites, e-commerce apps, etc.) to assume full responsibility for determining whether a website, portal or app complies with privacy and data retention requirements. So long as the data received by the browser is filtered through the PII application, then the possibility of PII being accidentally released or maliciously gathered is greatly reduced.

Also, the PII application in accordance with an embodiment of the invention does not require a website owner or administrator to allow a user to access any part of the computing system. To put it another way, the PII application can provide feedback to the user based solely on publicly available information provided by the website to the user's browser. It does not require any internal knowledge of the website. This removes the need for there to be any permissions provided from the website owner or administrator nor is there a need to integrate any aspect of the embodiment in a target website.

As websites, portals and apps are currently unrestricted in the way they collect and process data (from a technical rather than a legal perspective), then it follows that a user, when presented with a website, has little knowledge or protection from PII being captured or released, which in turn can cause privacy, safety, security, liability, technical and ethical issues. Therefore, the embodiments described herein provide a technical solution by which users can make their own assessment of the suitability or legality of interacting with a website, portal or app before they decide to enter their own PII. In other words, the embodiments described herein provide a technical solution to a problem that, in the past, has been dealt with by legal (i.e. non-technical) means, which is an inelegant solution that does nothing to ameliorate the problem of inappropriate PII capture, but rather can only seek to remedy the problem after the fact.

Moreover, developers and/or operators of websites, portals and/or apps which collect PII can use the PII application to test their website, portal and/or app to ensure that they comply with all legal and ethical obligations to their website users. The PII application provides operators with an ability to monitor, control and/or manage the collection of PII. As such, the app operates as both a safeguard to end users, but also importantly as a control tool for website administrators and developers.

As a corollary, operators who use the PII application would meet their ethical obligations as a service provider and therefore would be more attractive to consumers and/or users of their website, portal and/or app. As such, use of the PII application provides operators with an opportunity to demonstrate their "good corporate citizenship" and thereby increase their following and/or client base. As PII protection becomes not only legally necessary but a more visible issue amongst website users, the use of the PII application may also ameliorate legal liability concerns and/or reduce insurance premiums for operators, thereby also providing financial and marketplace advantages in addition to technical advantages.

Disclaimers

Throughout this specification, unless the context requires otherwise, the word "comprise" or variations such as "comprises" or "comprising", will be understood to imply the inclusion of a stated integer or group of integers but not the explicit exclusion of any other integer or group of integers.

Those skilled in the art will appreciate that the embodiments described herein are susceptible to obvious variations and modifications other than those specifically described, and it is intended that the broadest claims cover all such variations and modifications. Those skilled in the art will also understand that the inventive concept that underpins the broadest claims may include any number of the steps, features, and concepts referred to or indicated in the specification, either individually or collectively, and any and all combinations of any two or more of the steps or features may constitute an invention.

Where definitions for selected terms used herein are found within the detailed description of the invention, it is intended that such definitions apply to the claimed invention. However, if not explicitly defined, all scientific and technical terms used herein have the same meaning as commonly understood to one of ordinary skill in the art to which the invention belongs.

Although not required, the embodiments described with reference to the method, computer program, data signal and aspects of the system can be implemented via an application programming interface (API), an application development kit (ADK) or as a series of program libraries, for use by a developer, for the creation of software applications which are to be used on any one or more computing platforms or devices, such as a terminal or personal computer operating system or a portable computing device, a smartphone or a tablet computing system operating system, or within a larger server structure, such as a 'data farm' or within a larger transaction processing system.

Generally, as program modules include routines, programs, objects, components and data files that perform or assist in the performance of functions, it will be understood that the functionality of the method, computer program and data signal defined herein may be distributed across a number of routines, programs, objects or components to achieve the same functionality as the embodiment and the broader invention claimed herein. Such variations and modifications are contemplated by the inventor and are within the purview of those skilled in the art.

It will also be appreciated that where methods and systems of the present invention and/or embodiments are implemented by computing systems or partly implemented by computing systems then any appropriate computing system architecture may be utilised without departing from the inventive concept. This includes standalone computers, network computers and dedicated computing devices that do not utilise "software" as it is colloquially understood (such as field-programmable gate arrays).

Where the terms "computer", "computing system" and "computing device" are used in the specification, these terms are intended to cover any appropriate arrangement of computer hardware for implementing the inventive concept and/or embodiments described herein.

Where the terms "plug in", "PII application", "software application" and "application" are used in the specification when referring to an embodiment of the invention, these terms are intended to cover any appropriate software which is capable of performing the functions and/or achieving the outcomes as broadly described herein.

Where reference is made to communication standards, methods and/or systems, it will be understood that the devices, servers, etc., that constitute the embodiment or interact with the embodiment may transmit and receive data via any suitable hardware mechanism and software protocol, including wired and wireless communications protocols, such as but not limited to 2G, 3G and 4G telecommunications protocols, Wi-Fi, Bluetooth, other radio frequency, optical, acoustic, magnetic, GPS/GPRS, or any other form or method of communication that may become available from time to time.

The invention claimed is:

1. A method for identifying software capable of capturing personally identifiable information sent from a local device to a remote server, comprising the steps of:
   connecting to the remote server via the local device in order to send at least one request for data and retrieve at least one packet of data in response to the request, wherein the remote server is in communication with at least one third party server;
   sending at least one request for data and retrieving, from the remote server, at least one packet of data in response to the request;
   determining via an unpacking and decoding module that unpacks the at least one packet of data and decodes data residing in header fields, cookies, URL's, and request bodies in the at least one packet of data and detects third party domains residing in the header fields, cookies, URL's, and request bodies whether the at least one packet of data, received by the local device, originated from the at least one third party server other than the remote server, and
   if so, determining, using machine learning, whether the at least one packet of data contains evidence of the presence of the personally identifiable information provided to the remote server by the local device; and
   indicating, to a user, the presence of personally identifiable information by outputting a machine learning classification output.

2. A method in accordance with claim 1, wherein the step of determining whether the received data contains personally identifiable information includes the step of determining whether the received data includes data that has a specific signature pattern.

3. A method in accordance with claim 2, comprising the further step of determining whether the data has the specific signature pattern by comparing the data to a database of signature data patterns.

4. A method in accordance with claim 2, comprising the further step of sending data with the specific signature pattern to an identification module arranged to classify the data into data that contains personally identifiable information or into data that does not contain personally identifiable information.

5. A method in accordance with claim 1, wherein the received data is sent to a user to allow the user to further classify the data, wherein the classification elected by the user is utilised to provide input to the identification module.

6. A system for identifying software capable of capturing personally identifiable information sent from a local device to a remote server, the system comprising a processor, memory, and machine-readable instructions stored in the memory, the machine-readable instructions comprising:
   a module that, when executed by the processor, causes the system
      to connect to the remote server via the local device, wherein the remote server is in communication with at least one third party server, and
      to send at least one request for data and retrieve at least one packet of data in response to the request; and
   an identification module that, when executed by the processor, causes the system
      to receive the at least one requested packet of data and
      to determine via an unpacking and decoding module that unpacks the at least one packet of data and decodes data residing in header fields, cookies, URL's, and request bodies in the at least one packet of data and detects third party domains residing in the header fields, cookies, URL's, and request bodies whether the at least one requested packet of data received by the system originated from the at least one third party server other than the remote server, and
      if so, to determine, using machine learning, whether the at least one requested packet of data received by the system contains evidence of the presence of the personally identifiable information provided to the remote server by the local device, and
      to indicate, to a user, the presence of personally identifiable information by outputting a machine learning classification output.

7. A system in accordance with claim 6, wherein the identification module further includes a routine which, when executed by the processor, causes the system to determine whether the received data includes data that has a specific signature pattern.

8. A system in accordance with claim 7, wherein the identification module further includes a routine which, when executed by the processor, causes the system to determine whether the data has the specific signature pattern by comparing the data to a database of signature data patterns.

9. A system in accordance with claim 7, wherein the identification module, when executed by the processor, causes the system to send data with the specific signature pattern to the identification module, the identification module being arranged so that, when executed by the processor, causes the system to classify the data into data that contains personally identifiable information or into data that does not contain personally identifiable information.

10. A system in accordance with claim 6, wherein the identification module, when executed by the processor, causes the system to send the received data to a user to allow the user to classify the data, wherein the classification elected by the user is utilised as input to the identification module.

11. A non-transitory computer-readable medium including at least one instruction which when executed on a computing system performs steps comprising:
   connecting to a remote server via a local device in order to send at least one request for data and retrieve at least one packet of data in response to the request, wherein the remote server is in communication with at least one third party server;
   sending at least one request for data and retrieving, from the remote server, at least one packet of data in response to the request;
   determining via an unpacking and decoding module that unpacks the at least one packet of data and decodes data residing in header fields, cookies, URL's, and request bodies in the at least one packet of data and detects third party domains residing in the header fields, cookies, URL's, and request bodies whether the at least one packet of data, received by the local device, originated from the at least one third party server other than the remote server, and if so, determining, using machine learning, whether the at least one packet of data contains evidence of the presence of personally identifiable information provided to the remote server by the local device, and indicating, to a user, the presence of personally identifiable information by outputting a machine learning classification output.

12. The method of claim 1, wherein the method further comprises:

filtering data determined to originate from the at least one third party server other than the remote server; and unpacking and decoding the at least one packet of data in response.

13. The method of claim 2, wherein the signature pattern comprises a multi-dimensional signal vector, and wherein the method further comprises classifying the signal vector, using a support vector machine, to determine whether the signal vector contains personally identifiable information.

14. The method of claim 1, wherein determining whether the at least one packet of data received by the local device originated from the at least one third party server other than the remote server includes recording data sent and received.

15. The method of claim 14, wherein determining whether the at least one packet of data received by the local device originated from the at least one third party server other than the remote server includes determining whether a secondary request generated from a primary response transmitted to the at least one third-party server other than the remote server.

16. The system of claim 6, wherein determining whether the at least one packet of data received by the local device originated from the at least one third party server other than the remote server includes recording data sent and received.

17. The system of claim 16, wherein determining whether the at least one packet of data received by the local device originated from the at least one third party server other than the remote server includes determining whether a secondary request generated from a primary response transmitted to the at least one third-party server other than the remote server.

18. The non-transitory computer-readable medium of claim 11, wherein determining whether the at least one packet of data received by the local device originated from the at least one third party server other than the remote server includes recording data sent and received.

19. The non-transitory computer-readable medium of claim 18, wherein determining whether the at least one packet of data received by the local device originated from the at least one third party server other than the remote server includes determining whether a secondary request generated from a primary response transmitted to the at least one third-party server other than the remote server.

* * * * *